Nov. 25, 1969   G. D. LA MASTERS   3,479,816
BY-PASS VALVE FOR AIR INJECTION SYSTEM
Filed Feb. 1, 1968   3 Sheets-Sheet 1
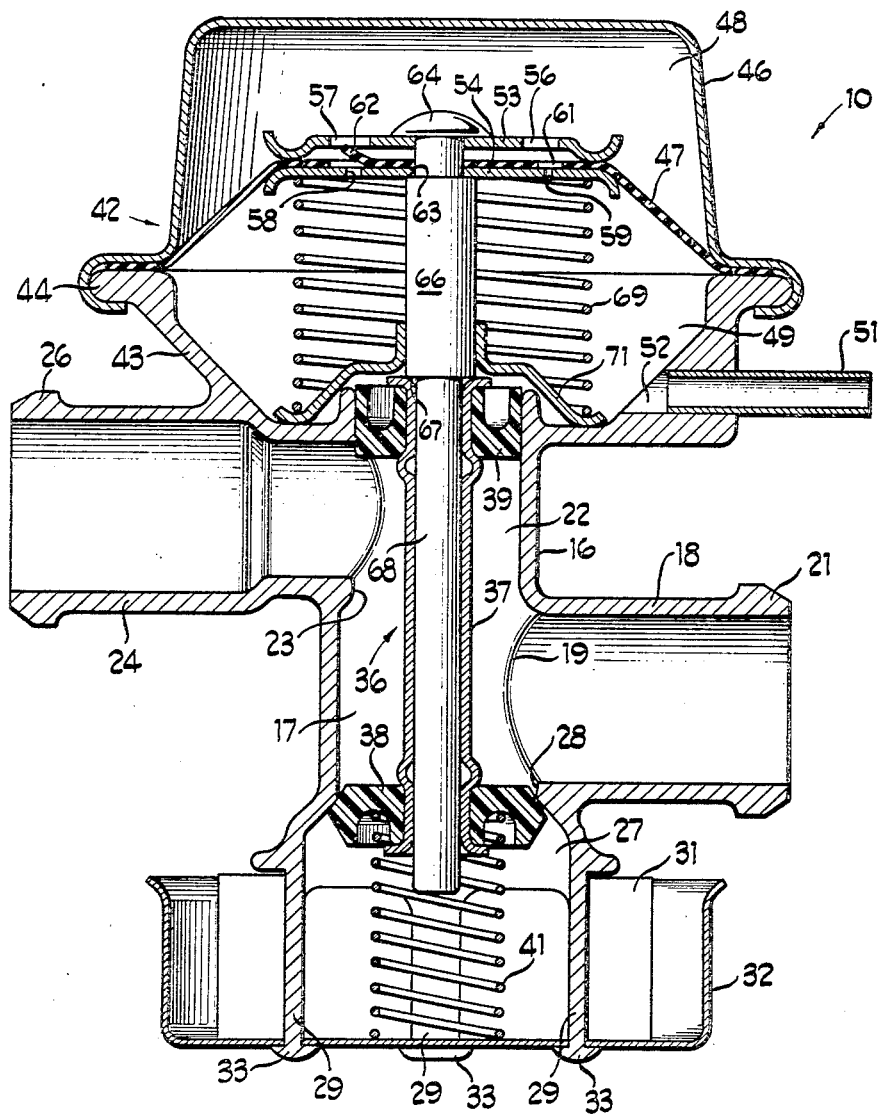
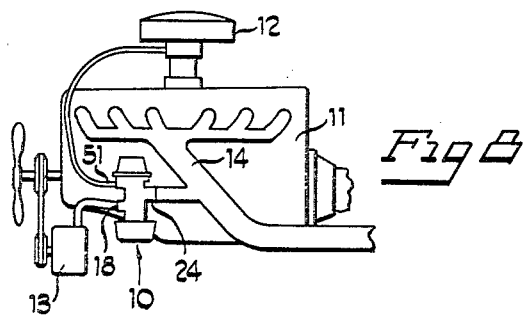
INVENTOR
GEORGE D. La MASTERS
BY Herman E. Smith
ATTORNEY INVENTOR
GEORGE D. La MASTERS BY Herman E. Smith
ATTORNEY

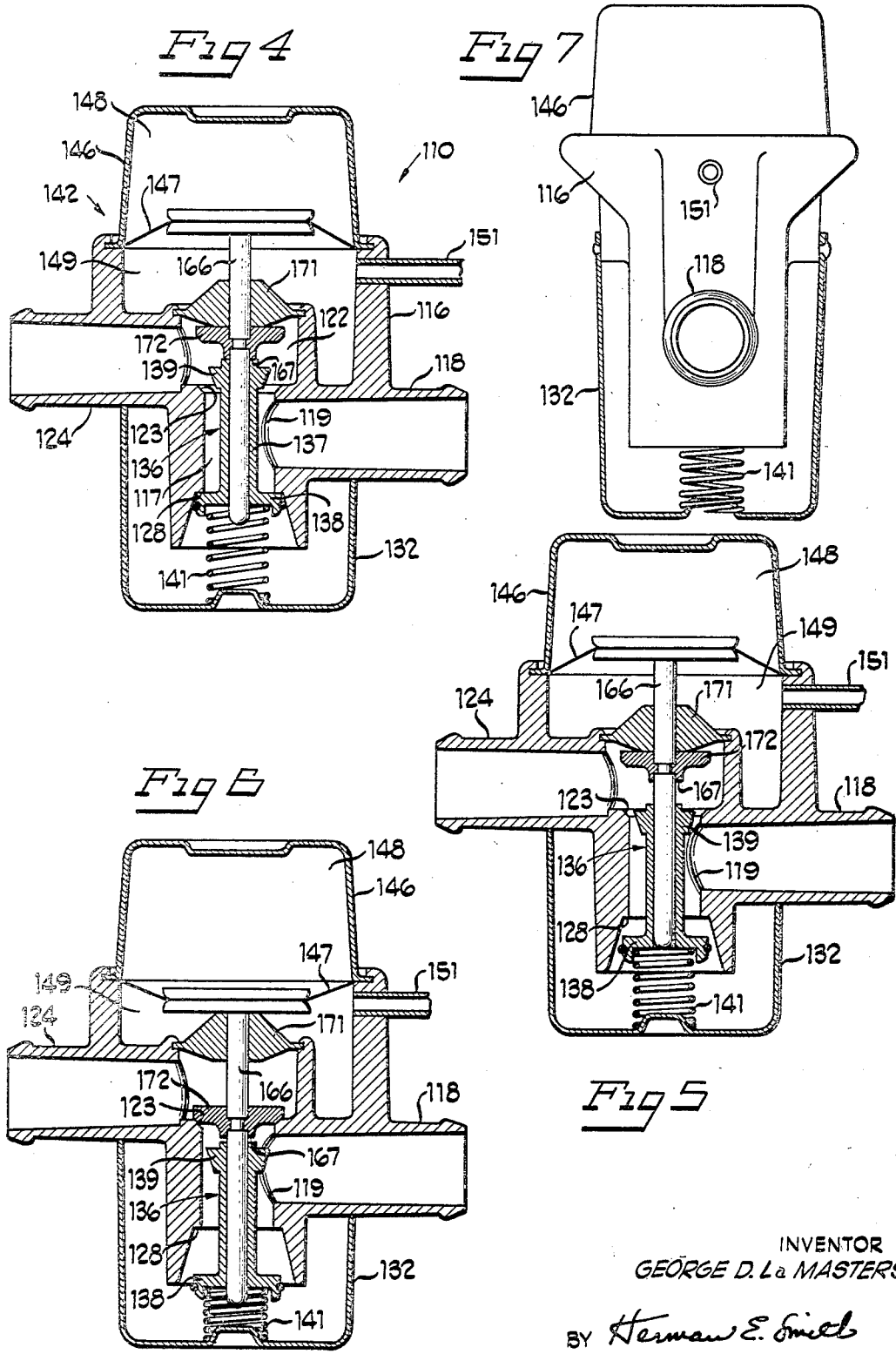

United States Patent Office 3,479,816
Patented Nov. 25, 1969

3,479,816
BY-PASS VALVE FOR AIR INJECTION SYSTEM
George D. La Masters, Decatur, Ill., assignor to Borg-Warner Corporation, Chicago, Ill., a corporation of Delaware
Filed Feb. 1, 1968, Ser. No. 702,266
Int. Cl. F01n 3/02
U.S. Cl. 60—30                 5 Claims

ABSTRACT OF THE DISCLOSURE

A by-pass valve for controlling the flow of ventilating air to the exhaust system of an internal combustion engine includes a dual valve element co-operating with a pair of ports which divert available ventilating air while restricting air flow to the exhaust system. The valve element is directly operable in response to excess pressure in the valve body and is also independently operable in response to a rapid pressure drop in the engine intake manifold by means of a vacuum servo-motor acting on the valve element through a lost motion connection.

Summary

The present invention relates generally to an air injection system for reducing emission contaminants in the exhaust of an internal combustion engine and more particularly to a by-pass valve for regulating the flow of ventilating air therein.

It is well known that internal combustion engines have been named as a contributory source of air pollution in that unburned hydrocarbons from the fuel are emitted with the exhaust. These unburned hydrocarbons represent inefficiency in the operation of the engine and arise from the necessity of operating the engine at varying speeds and loads to meet various highway and traffic conditions encountered by automotive vehicles.

Attempts have been made to reduce air pollutants from vehicular internal combustion engines by providing air injection apparatus which introduces fresh air into the exhaust system of the engine. The combustion process is continued in the presence of an excess of air thereby assuring more complete combustion in order to reduce the unburned hydrocarbons to relatively harmless compounds.

Among the problems encountered in the application of such apparatus to existing vehicles are the presence of objectionably high back pressures on the engine at high vehicle speeds, and the occurrence of exhaust system explosions when the vehicle is decelerated. For example, a ventilating air pump or compressor is often directly connected to the engine such that the ventilating air pressure increases as a function of engine speed. Thus, at high engine speeds, the injection of such air creates a higher back pressure on the engine, interfering with its performance.

A further problem arises when the throttle of the vehicle is suddenly backed off. This condition results in low pressure in the intake manifold of the engine tending to boil liquid fuel adhering to the walls thereof. The reduction of available air together with the additional vaporized fuel results in the introduction of an excessively rich mixture to the combustion chamber of the engine. An excessively rich mixture has been shown to cause the engine to misfire and, in effect, is pumped through the engine into the exhaust manifold. If such mixture immediately encounters an excess of air, the combustion which should have occurred in the engine cylinder, will instead occur in the exhaust system with explosive force tending to wreck the exhaust system. It is therefore, desirable to provide an air injection system which momentarily withholds excess air from the exhaust system, when such excessively rich mixtures are present, and then gradually introduces or meters excess air to the exhaust system so that the mixture will be burned to completion at less than explosive rates of combustion before leaving the exhaust system.

It is also desirable to admit excess air to the exhaust system at rates which tend to cool the burning gases in order to avoid excessively high temperatures which would tend to interfere with engine performance.

Prior air injection systems have employed a relief valve on the air pump, or compressor, for limiting the maximum pressure of ventilating air supplied to the exhaust system, but such devices tend to result in a noise level which is found to be objectionable. Simple by-pass valves have been employed which operated responsive to intake manifold vacuum for the purpose of interrupting the flow of ventillating air to the exhaust manifold when excessively rich mixtures are present. Check valves have been employed for protecting the air injection apparatus from the explosive effects of rapid combustion in the exhaust system when such condition occurs. Such prior systems are objectionable in that they fail to provide for metering air to the exhaust system.

The improved by-pass valve according to the present invention incorporates a number of desirable objects and advantages for use in an air injection system while avoiding some of the objectionable features of prior systems. For example, the improved by-pass valve of the present invention includes a two element valve spool having one element sensitive to and operable in response to pressure rise in the valve body in the manner of a pressure relief valve. This element is, therefore, operable in response to either an increase in ventilating air pressure such as would occur at high vehicle speeds, or responsive to an increase in exhaust system pressure such as would occur under high engine loading or when explosive combustion has occurred in the exhaust system. The other spool element is connected to the first element, and is effective to throttle the air supplied to the exhaust system. Thus, when pressure relief conditions are present, either in the ventilating air system or in the exhaust system, the valve spool functions automatically not only to relieve pressure by diverting flow from the ventilating system through a diversion port in the valve, but also functions to restrict or meter flow to the exhaust system. The diversion port is advantageously provided with an acoustical suppressor for attenuating the noise level of ventilating air by-passed therethrough. In addition, this spool valve member is independently operable in response to intake manifold vacuum by means of a vacuum servo-motor connected thereto by means of a lost motion drive connection. Such servo-motor is advantageously provided with a bleed orifice through the diaphragm thereof such that it operates in response to those changes in manifold vacuum which tend to boil the fuel, while allowing normal operation of the air injection apparatus during more gradual changes in manifold vacuum. The vacuum servo-motor, in combination with the throttling portion of the spool valve, is effective to progressively restrict ventilating air to the exhaus system as excessively rich mixtures are introduced thereto. The vacuum servo-motor and valve spool are effective to momentarily isolate the exhaust system from the ventilating air when excessively rich mixtures are present which would tend to cause explosive combustion in the exhaust system.

Other objects and advantages of the invention will become apparent from a consideration of the following description together with the drawings illustrating preferred embodiments thereof.

Brief description of the drawings

FIGURE 1 is an elevation view, in section, of a preferred embodiment of the by-pass valve according to the present invention;

FIGURE 4 is an elevation view, in section, of an alternate preferred embodiment of the invention;

FIGURE 5 is a view of the embodiment of FIGURE 4, showing the elements of the valve in an intermediate throttling position;

FIGURE 6 is a view of the embodiment of FIGURE 4, showing the elements of the valve in a second position for sealing the exhaust port;

FIGURE 7 is a side view of the valve shown in FIGURE 4; and

FIGURE 8 is an environmental schematic view of an internal combustion engine equipped with air injection apparatus.

Description of the preferred embodiments

Figure 2:
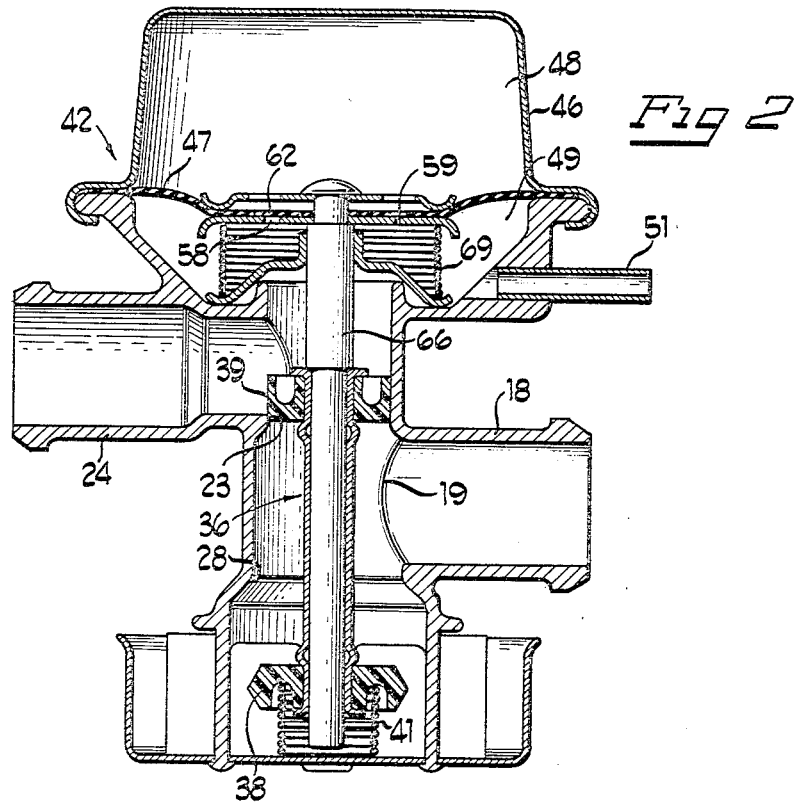
FIGURE 2 is a view similar to FIGURE 1, showing the elements of the valve in a second position for sealing the exhaust port.

Referring now to the drawings and more particularly to FIGURES 1 and 8, thereof, the reference character 10 indicates an improved by-pass valve especially adapted for utilization in an air injection system for an internal combustion engine. FIGURE 8 schematically illustrates an internal combustion engine having an air intake system 12, and exhaust system 14 equipped with air injection apparatus, including the by-pass valve 10 and a source of ventilating air such as an air compressor 13.

By-pass valve 10 includes a valve body 16 which defines a central cavity 17. A tubular extension 18 intersects central cavity 17 as indicated at 19 to define an inlet port. Tubular extension 18 is provided with an external flange 21 for facilitating a flexible hose connection between inlet 19 and the source of ventilating air 13.

Valve body 16 also includes an upper cavity 22 communicating with central cavity 17 and defined in part by a neck portion 23 providing an exhaust port. Upper cavity 22 intersects an additional tubular extension 24 also provided with an exhaust flange 26 for facilitating a flexible hose connection with exhaust system 14.

A lower portion of valve body 16 includes a lower cavity 27 intersection central cavity 17 in a neck portion 28 defining a diversion port. Lower cavity 27 is liberally apertured as indicated by leg portions 29, and is surrounded by an acoustical suppressor 31 for reducing the noise level of air by-passed through diversion port 28. Suppressor element 31 is retained within a cup 32 secured to valve body 16 by means of rivet-like heads 33 formed on the ends of legs 29.

A valve spool member 36 is mounted within valve body 16 for movement from a first position (as illustrated in FIGURE 1), through a range of intermediate positions, to a second position (as illustrated in FIGURE 2). Spool member 36 includes a sleeve portion 37 having a pair of spaced annular land members 38 and 39 secured thereto. The larger annular land member 38 provides a first flow control means associated with diversion port 28, while the smaller annular land member 39 provides a second throttling flow control means associated with exhaust port 23. As viewed in FIGURE 3, annular land portion 39 is effective to throttle flow through exhaust port 23 when the valve spool is in an intermediate position. Annular land portion 39 also co-operates with exhaust port 23 to seal the same when the valve spool is in the second position as viewed in FIGURE 2.

Valve spool 36 is normally biased to its first position (FIGURE 1) by means of a coil compression spring 41, having one end thereof bearing against a portion of cup 32 while its opposite end bears against a portion of annular land member 38.

An external actuating device 42 for independently operating valve spool 36 is mounted on the upper portion of valve body 16. As shown, external actuating device 42 is in the form of a vacuum servo-motor. The upper portion of valve body 16 includes a cup shaped portion 43 having a rim 44. A cap 46 is secured to rim 44 and serves to clamp the periphery of an elastic diaphragm 47 to cup shaped portion 43. Cap 46 and diaphragm 47 define an upper atmospheric chamber 48, while cup portion 43 and the diaphragm define a lower vacuum chamber 49. A tubular member 51 extends from vacuum port 52 in vacuum chamber 49, for communication with the engine intake system 12. A center portion of elastic diaphragm 47 is re-enforced by a pair of discs 53 and 54. Disc 53 is provided with a pair of larger orifices 56, 57, while disc 54 is provided with an intermediate orifice 58 in register with orifice 57, and a smaller orifice 59 in register with orifice 56. The central portion of diaphragm 47 is provided with an orifice 61 in register with orifice 56 and 59, and includes a flap valve 62 in register with orifices 56 and 59, and includes a flap valve 62 in register with orifices 57 and 58. Discs 53 and 54 are secured in clamping engagement with the central portion of diaphragm 47 by means of the shoulder 63 and head 64 on plunger 66. Another shoulder 67 of plunger 66 is engageable with sleeve portion 37 of valve spool member 36 and forms a lost motion connection permitting spool member 36 to be moved either by the vacuum servo-motor or by means of air pressure in the valve body. Plunger 66 is provided with a rod-like extension 68 which is slidable within sleeve 37 and serves to guide the movement thereof when valve spool member 36 is moved in response to pressure within the valve body. A coil spring 69 extends between plunger guide member 71 and a portion of disc 54, urging diaphragm 47 and plunger 66 to an upper position permitting valve spool 56 to assume its first position.

The orifices and flap valve described above serve to modify the operation of servo-motor 42 such that it responds to changes in pressure rather than solely to the degree of pressure in the engine intake system. Flap valve 62 is normally biased open, as shown in FIGURE 1, thereby permitting communication between atmospheric chamber 48 and vacuum chamber 49 through orifices 57 and 58. Thus, a gradual change in the partial vacuum in vacuum chamber 49 results in a flow of air from atmospheric chamber 48 through orifices 57 and 58 without disturbing the position of diaphragm 47. However, a sudden pressure drop in vacuum chamber 49 closes a flap valve 62 and results in downward movement of diaphragm 47 and plunger 66. The smaller orifice 59 continuously bleeds air from atmospheric chamber 48 through diaphragm 47 such that the diaphragm and plunger resumes the normal position under the urgence of spring 59, even though a lower pressure continues to exist in vacuum chamber 49.

Referring now to FIGURE 4, an alternate embodiment of the by-pass valve is shown which includes certain modifications of the servo-motor and valve spool. The modified form of the by-pass valve is indicated by reference character 110 and includes a valve body 116. A cup 132 is secured to the lower portion thereof and a cap 146 is secured to the upper portion, thereof. Valve body 116 is provided with a tubular inlet fitting 118 intersecting a central cavity 117 in the valve body. A tubular exhaust fitting 114 intersects upper cavity 122. The intersection of inlet fitting 118 with central cavity 117 defines an inlet port 119, while the intersection of central cavity 117 with upper cavity 122 defines in exhaust port 123. A diversion port 128 is provided at the lower end of the central cavity 117. As shown in FIGURE 7, the air which is by-passed through diversion port 117 passes upwardly along the inside of cup 132 exiting adjacent the point of connection with valve body 116.

The movable valve spool member 136 includes a central sleeve portion 137 having an annular throttling land member 139 on the upper portion thereof, and a larger annular land member 138 on the lower portion thereof. A compression spring 141 urges valve spool 136 to a first position, shown in FIGURE 4, in which annular land member 138 is in sealing engagement with diversion port 128.

A diaphragm 147 serves, in part, to define an atmospheric chamber 148, and a vacuum chamber 149 of a vacuum servo-motor 142. The vacuum chamber 149 is provided with a fitting 151 for connection with the intake manifold of an internal combustion engine. A plunger guide 171 embraces a plunger 166 which is connected to a diaphragm 147 for movement therewith. A portion of plunger 166 extends into sleeve 137 of valve spool 136 and serves as a guide therefor.

Plunger 166 is provided with a sealing member 172 having a shoulder 167 engageable with the upper end of spool member 136. The spring 141 thus serves to bias both the spool member 136 and diaphragm 147 of servomotor 142 to a first position as shown in FIGURE 4, in which fluid communication is established exclusively between inlet port 119 and exhaust port 123.

Operation

Figure 3:
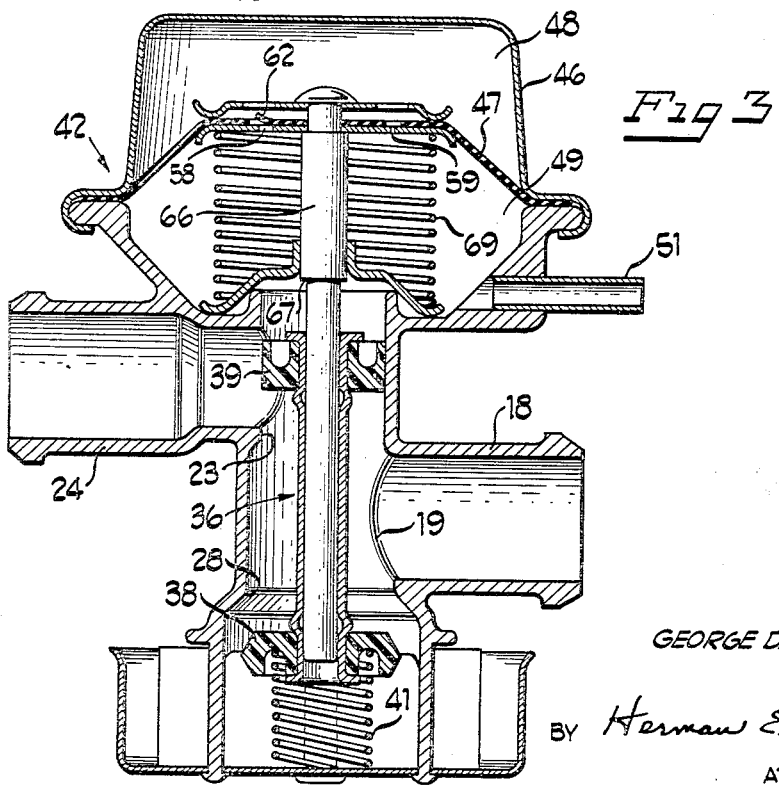
FIGURE 3 is a view similar to FIGURE 1, showing the elements of the valve in an intermediate throttling position.

The operation of the first embodiment of the by-pass valve is illustrated in FIGURES 1, 2, and 3. In FIGURE 1, the spool valve 36 is in the first position wherein communication is established exclusively between inlet port 19 and exhaust port 23, the diversion port 28 being sealed by the larger annular land portion 38. In this first position, all the air provided by compressor 13 is conducted to exhaust system 14 through the by-pass valve 10.

The second position of valve spool 36 is shown in FIGURE 2. When the throttle of engine 11 is suddenly closed, the pressure in the engine intake system 12 drops quickly, creating a high partial vacuum in vacuum chamber 49. The condition results in downward movement of diaphragm 47 and plunger 66. Plunger 66 forces valve spool 36 downwardly to the position shown in FIGURE 2 wherein the smaller annular land member 39 is in sealing engagement with exhaust port 23. In this second position the ventilating air system is isolated from the exhaust system, all the ventilating air being dumped through diversion port 28. The smaller annular land portion 39 thus serves to prevent excess air from reaching the excessively rich mixture present in the exhaust system after a throttle back off, and also serves to isolate the ventilating air system from the effects of explosive combustion if such should occur in the exhaust system. The bleed orifice 59 permits air flow from atmospheric chamber 48 into vacuum chamber 49, allowing the diaphragm and plunger to gradually return to the first position as illustrated in FIGURE 1. Valve spool 36 follows the movement of plunger 66 under the urgence of spring 41 such that ventilating air is gradually metered into the exhaust system through exhaust port 23. When valve spool 36 and plunger 66 have returned to the first position, full communication is reestablished between the inlet and exhaust ports. The full output of the compressor becomes available to the exhaust system to supply a sufficiency of air for complete combustion and to cool the exhaust system. Whereas FIGURE 2 illustrates the position of the valve spool and servo-motor after a severe pressure drop in the intake manifold, it is believed evident, without additional illustration, that a less severe pressure drop would result in movement of the valve spool to an intermediate position after which it would gradually return to its first position.

As illustrated in FIGURE 3, valve spool 36 is operable, independently of the vacuum servo-motor 42. Where engine speed is increased to a value which would result in objectionably high ventilating air pressures, the lower, larger, annular land member 38 is moved downwardly against the bias of spring 41, away from diversion port 28, by-passing a portion of the ventilating air therethrough. Simultaneously, the upper annular land member 39 is moved closer to exhaust port 23 throttling the flow of ventilating air therethrough.

The operation of the second embodiment of the by-pass valve is illustrated in FIGURES 4 through 7, and is similar to the operation of the first embodiment. The first position of valve spool 136 and plunger 166 is shown in FIGURE 4. In this first or normal operating position, the diversion port 128 is sealed by annular land member 138 such that communication is established exclusively between the inlet port 119 and exhaust port 123. The entire output of ventilating air from the compressor is thus available to the exhaust system.

The second position of valve spool 136 is illustrated in FIGURE 6 and results from a rapid pressure drop in the intake manifold of the engine. Under such condition the partial vacuum developed in vacuum chamber 149 results in downward movement of plunger 166 pushing valve spool 136 downwardly against the bias of spring 141 and seating sealing member 172 against exhaust port 123. It should be noted that ventilating air entering the valve body through the inlet port 119 impinges upon both the annular land member 138 and the sealing member 172. The pressure of the ventilating air thus urges the valve spool downwardly to by-pass air through diversion port 128, and also urges sealing member 172 upwardly tending to bleed air to the exhaust system and return plunger 166 to its first position. The diaphragm 141 is preferably provided with a bleed orifice and flap valve similar to the construction of the first embodiment such that the diaphragm and plunger are permitted to return to the first or normal position after a rapid pressure drop in the intake manifold. While an extreme condition is illustrated in FIGURE 6, it is believed evident that a less severe pressure drop would result in the movement of the plunger and valve spool to an intermediate position which restricts flow to the exhaust system but does not entirely seal the exhaust port.

Independent operation of valve spool 136 in response to pressure in the valve body is illustrated in FIGURE 5 wherein valve spool 136 is shown in an intermediate position between its first and second positions. The upper annular land member 139 is effective to throttle flow through exhaust port 123 while the lower annular land member 138 permits the by-passing of ventilating air through diversion port 128. Movement of valve spool 136 from its first position through a range of intermediate positions toward its second position thus results in the progressive restriction of flow through exhaust port 123 while increasing flow is permitted through diversion port 128.

I claim:
1. In air injection apparatus for an internal combustion engine equipped with an air intake system (12) and an exhaust system (14), said apparatus including a ventilating air system having a source of air (13) under pressure, an improved by-pass valve (10, 110) for selectively regulating the flow of air from said ventilating system to said exhaust system for reducing emission contaminants therein, comprising: a valve body (16, 116) having an inlet port (19, 119) adapted for communication with said ventilating system, an exhaust port (23, 123) adapted for communication with said exhaust system, and a diversion port (28, 128); and a valve spool member (36, 136) disposed within said body and movable with respect to said ports through a range of intermediate positions between a first position and a second position, said spool member including a first annular land member (38, 138) effective to communicate said inlet port exclusively with said exhaust port when said spool member is in said first position, and including a second annular land member (39, 139) effective to progressively throttle said exhaust port during movement through said range of intermediate positions, said second annular land member having a smaller area than said first annular land member, said first (38, 138) and second (39, 139) land members being spaced from each other and secured to a sleeve (37, 137), said first and second land members and sleeve being biased to said first posiiton and movable therefrom into said intermediate range of positions responsive to either increasing pressure in said valve body acting upon said first land member, or responsive to operation of an actuating device (42, 142) external of said valve body, said actuating device including a portion (67, 167) engageable with said sleeve by means of a lost motion connection.

2. The invention according to claim 1, in which said external actuating device (42, 142) includes a vacuum servo-motor having a plunger (66, 166) extending into said valve body, engageable with said valve spool member (36, 136) sleeve portion (37, 137), said vacuum servo-motor communicating with said engine air intake system and operable in response to a rapid pressure drop therein.

3. The invention according to claim 2, wherein said vacuum servo-motor (42, 142) includes a diaphragm (47, 147) connected to said plunger (66, 166) having a bleed orifice (59) extending therethrough, said bleed orifice permitting said diaphragm to resume its normal position following displacement thereof.

4. The invention according to claim 2, in which said servo-motor plunger (66) is engageable with said sleeve (37) effective to move said second annular land member (39) through said intermediate range of positions to said second position, wherein said second annular land member is disposed in sealing relationship with said exhaust port (23), providing communication exclusively between said inlet port (19) and said diversion port (28).

5. The invention according to claim 2, in which said servo-motor plunger (166) includes a sealing member (172) independent of said second annular land member (139) effective to seal said exhaust port (123) upon movement of said valve spool member (136) to said second position.

References Cited

UNITED STATES PATENTS

| | | | |
|---|---|---|---|
| 3,392,523 | 7/1968 | Hyde | 60—30 |
| 3,397,534 | 8/1968 | Knowles | 60—30 |
| 3,430,437 | 3/1969 | Saussele | 60—30 |

CARLTON R. CROYLE, Primary Examiner

D. HART, Assistant Examiner